US012603289B2

United States Patent
(12) United States Patent
Iguchi et al.

(10) Patent No.: US 12,603,289 B2
(45) Date of Patent: Apr. 14, 2026

(54) POLYVINYLIDENE FLUORIDE, BINDER, ELECTRODE MIXTURE, ELECTRODE, AND SECONDARY BATTERY

(71) Applicant: DAIKIN INDUSTRIES, LTD., Osaka (JP)

(72) Inventors: Takashi Iguchi, Osaka (JP); Takahiro Kitahara, Osaka (JP); Ryouichi Yano, Osaka (JP); Kazuya Asano, Osaka (JP); Kanako Arai, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 813 days.

(21) Appl. No.: 17/896,199

(22) Filed: Aug. 26, 2022

(65) Prior Publication Data

US 2022/0416250 A1 Dec. 29, 2022

Related U.S. Application Data

(63) Continuation of application No. PCT/JP2021/007676, filed on Mar. 1, 2021.

(30) Foreign Application Priority Data

Feb. 28, 2020 (JP) ................................ 2020-034056

(51) Int. Cl.

| | |
|---|---|
| ***H01M 4/62*** | (2006.01) |
| ***C08F 214/22*** | (2006.01) |
| ***H01M 4/505*** | (2010.01) |
| ***H01M 4/525*** | (2010.01) |
| ***H01M 10/0525*** | (2010.01) |

(52) U.S. Cl.

CPC ......... *H01M 4/623* (2013.01); *C08F 214/225* (2013.01); *H01M 4/505* (2013.01); *H01M 4/525* (2013.01); *H01M 10/0525* (2013.01); *C08F 2800/10* (2013.01)

(58) Field of Classification Search

CPC ...... H01M 4/623; H01M 4/505; H01M 4/525; H01M 10/0525; H01M 10/052; H01M 4/13; H01M 4/02; H01M 4/04; H01M 4/139; H01M 4/62; C08F 214/225; C08F 2800/10; C08F 220/04; C08K 3/04; C08K 2003/2203; C08K 2003/2217; C08K 2003/2289; C08K 2003/2293; C09D 127/16; Y02E 60/10; H01G 11/38

See application file for complete search history.

(56) References Cited

U.S. PATENT DOCUMENTS

| | | | | |
|---|---|---|---|---|
| 5,900,183 | A | 5/1999 | Kronfli et al. | |
| 2018/0269484 | A1 | 9/2018 | Kobayashi et al. | |
| 2019/0252685 | A1 | 8/2019 | Abusleme et al. | |
| 2019/0296359 | A1* | 9/2019 | Asano ...................... | H01M 4/62 |
| 2020/0243862 | A1 | 7/2020 | Hosoda et al. | |

FOREIGN PATENT DOCUMENTS

| | | | |
|---|---|---|---|
| CN | 109075342 | A | 12/2018 |
| EP | 3 447 831 | A1 | 2/2019 |
| EP | 3 680 969 | A1 | 7/2020 |
| JP | 7-201316 | A | 8/1995 |
| JP | 2019-533051 | A | 11/2019 |
| KR | 10-2018-0116451 | A | 10/2018 |
| TW | 201923003 | A | 6/2019 |
| WO | 2008/129041 | A1 | 10/2008 |
| WO | 2017/056974 | A1 | 4/2017 |
| WO | 2018/066430 | A1 | 4/2018 |
| WO | 2018/073277 | A1 | 4/2018 |
| WO | 2019/087652 | A1 | 5/2019 |
| WO | 2019/199753 | A1 | 10/2019 |

OTHER PUBLICATIONS

Extended European Search Report issued Feb. 23, 2024 in Application No. 21761347.0.
Extended European Search Report issued Feb. 26, 2024 in Application No. 21760992.4.
International Search Report issued for PCT/JP2021/007676 dated May 11, 2021.
International Search Report issued for related PCT/JP2021/007678 dated May 11, 2021.
International Preliminary Report on Patentability dated Aug. 30, 2022 with a Translation of the Written Opinion of the International Searching Authority in Application No. PCT/JP2021/007678.
International Preliminary Report on Patentability dated Aug. 30, 2022 with a Translation of the Written Opinion of the International Searching Authority in Application No. PCT/JP2021/007676.

* cited by examiner

*Primary Examiner* — Andrew J. Oyer
(74) *Attorney, Agent, or Firm* — Sughrue Mion, PLLC

(57) ABSTRACT

Provided is a polyvinylidene fluoride comprising: vinylidene fluoride unit; and a pentenoic acid unit represented by formula (1): $CH_2{=}CH{-}(CH_2)_2{-}COOY$ wherein Y represents at least one selected from the group consisting of an inorganic cation and an organic cation, a content of vinylidene fluoride unit is 95.0 to 99.99 mol % based on all monomer units of the polyvinylidene fluoride, and a content of the pentenoic acid unit is 0.01 to 5.0 mol % based on all monomer units of the polyvinylidene fluoride.

6 Claims, No Drawings

POLYVINYLIDENE FLUORIDE, BINDER, ELECTRODE MIXTURE, ELECTRODE, AND SECONDARY BATTERY

CROSS-REFERENCE TO RELATED APPLICATIONS

This application is a Rule 53(b) Continuation of International Application No. PCT/JP2021/007676 filed Mar. 1, 2021, which claims priority based on Japanese Patent Application No. 2020-034056 filed Feb. 28, 2020, the respective disclosures of which are incorporated herein by reference in their entirety.

TECHNICAL FIELD

The present disclosure relates to a polyvinylidene fluoride, a binder, an electrode mixture, an electrode, and a secondary battery.

BACKGROUND ART

Patent Document 1 proposes that a linear semi-crystalline copolymer [polymer (A)] comprising repeating units derived from a vinylidene fluoride (VDF) monomer and a hydrophilic (meth)acrylic monomer (MA) such as acrylic acid, the polymer (A) comprising 0.05 to 10 mol % of the repeating unit derived from the hydrophilic (meth) acrylic monomer (MA) and being characterized by a fraction of a randomly distributed unit (MA) of at least 40%, is used as a binder for forming an electrode of a lithium battery and/or an electric double layer capacitor.

Patent Document 2 proposes a composition (C) comprising:

at least one semi-crystalline fluoropolymer [polymer (F1)] comprising a repeating unit derived from vinylidene fluoride (VDF) in an amount of at least 50 mol % based on the total number of moles of repeating units of polymer (F1), and a repeating unit derived from at least one functional hydrogenated monomer comprising at least one hydrophilic (meth)acrylic monomer (MA) of formula (I):

(I)

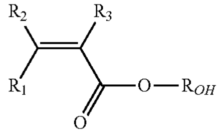

wherein:

$R_1$, $R_2$, and $R_3$, identical to or different from each other, are each independently selected from a hydrogen atom and a $C_1$ to $C_3$ hydrocarbon group, and $R_{OH}$ is a hydrogen atom or a $C_1$ to $C_5$ hydrocarbon moiety containing at least one hydroxyl group, in an amount of at least 0.1 mol %, preferably at least 0.3 mol %, further more preferably at least 0.5 mol %, and 5 mol % or less based on the total number of moles of repeating units of polymer (F1), the polymer (F1) having an intrinsic viscosity measured in dimethylformamide at 25° C. of higher than 1.4 dl/g, preferably higher than 2 dl/g, further more preferably higher than 2.5 dl/g, and lower than 5 dl/g; and at least one fluoropolymer [polymer (F2)], different from (F1), comprising a repeating unit derived from vinylidene fluoride (VDF) in an amount of at least 50 mol % based on the total number of moles of repeating units of polymer (F2), and a repeating unit derived from at least one fluorinated monomer (FM) different from vinylidene fluoride in an amount of at least 2.5 mol %, preferably at least 4.0 mol %, further more preferably at least 6 mol % based on the total number of moles of repeating units of polymer (F2), wherein polymer (F1) forms at least 10% by weight over the total weight of the composition (C), and polymer (F2) foams at most 90% by weight over the total weight of the composition (C).

Patent Document 3 proposes a binder composition used for binding an electrode active material to a current collector to which the electrode active material is applied, the binder composition comprising a first vinylidene fluoride-based polymer having an intrinsic viscosity of 1.7 dl/g or more and a second vinylidene fluoride-based polymer comprising acrylic acid or methacrylic acid as a monomer unit.

CITATION LIST

Patent Literature

Patent Literature 1: International Publication No. WO 2008/129041

Patent Document 2: International Publication No. WO 2018/073277

Patent Document 3: International Publication No. WO 2017/056974

SUMMARY

According to the present disclosure, provided is a polyvinylidene fluoride comprising: vinylidene fluoride unit; and a pentenoic acid unit represented by formula (1): $CH_2{=}CH{-}(CH_2)_2{-}COOY$ wherein Y represents at least one selected from the group consisting of an inorganic cation and an organic cation, a content of vinylidene fluoride unit is 95.0 to 99.99 mol % based on all monomer units of the polyvinylidene fluoride, and a content of the pentenoic acid unit is 0.01 to 5.0 mol % based on all monomer units of the polyvinylidene fluoride.

Effects

According to the present disclosure, there can be provided a polyvinylidene fluoride and a binder that have excellent electrolytic solution swelling resistance and adhesion to a metal foil and can foam an electrode having excellent flexibility, and an electrode mixture, an electrode, and a secondary battery that use the polyvinylidene fluoride and the binder.

DESCRIPTION OF EMBODIMENTS

Hereinafter, specific embodiments of the present disclosure will be described in detail, but the present disclosure is not limited to the following embodiments.

The polyvinylidene fluoride (PVdF) of the present disclosure contains a vinylidene fluoride (VdF) unit and a pentenoic acid unit.

The pentenoic acid unit contained in the PVdF is a unit based on a monomer represented by formula (1): $CH_2{=}CH{-}(CH_2)_2{-}COOY$ wherein Y represents at least one selected from the group consisting of an inorganic cation and an organic cation.

In formula (1), Y represents an inorganic cation and/or an organic cation. Examples of the inorganic cation include a cation such as H, Li, Na, K, Mg, Ca, Al, or Fe. Examples of the organic cation include a cation such as $NH_4$, $NH_3R^5$, $NH_2R^5_2$, $NHR^5_3$, or $NR^5_4$ wherein $R^5$ independently represents an alkyl group having 1 to 4 carbon atoms. Y is preferably at least one selected from the group consisting of H, Li, Na, K, Mg, Ca, Al, and $NH_4$, and more preferably at least one selected from the group consisting of H, Li, Na, K, Mg, Al, and $NH_4$, further preferably at least one selected from the group consisting of H, Li, Al, and $NH_4$, and particularly preferably H. Specific examples of the inorganic cation and the organic cation are described by omitting their signs and valences for convenience.

The PVdF of the present disclosure contains 95.0 to 99.99 mol % of a VdF unit and 0.01 to 5.0 mol % of a pentenoic acid unit based on all monomer units of the PVdF. The PVdF of the present disclosure contains a VdF unit and a pentenoic acid unit, and further, the content of the VdF unit and the content of the pentenoic acid unit are appropriately adjusted, and thus the PVdF of the present disclosure has excellent electrolytic solution swelling resistance and adhesion to a metal foil and can foam an electrode having excellent flexibility.

The technology of introducing an acrylic acid unit or the like into a PVdF used as a binder for forming an electrode of a secondary battery, a capacitor, or the like in order to improve the adhesion of the PVdF to a metal foil (current collector) is conventionally known. However, there is a need for a PVdF having excellent electrolytic solution swelling resistance and flexibility while ensuring sufficient adhesion to a metal foil (current collector).

It has been found that selection of a pentenoic acid unit as a monomer unit to be introduced into a PVdF and further, adjustment of the content of the VdF unit and the content of the pentenoic acid unit within their respective specific ranges can remarkably improve the electrolytic solution swelling resistance of the PVdF, ensure sufficient adhesion of the PVdF to a metal foil (current collector), and form an electrode having excellent flexibility. The PVdF of the present disclosure is a novel polymer completed based on such findings.

In addition, because the PVdF of the present disclosure has an appropriately adjusted content of the pentenoic acid unit, the PVdF of the present disclosure can be used to foam an electrode in which an electrode material layer and a metal foil (current collector) are sufficiently adhered to each other and which has a sufficient ability to retain a powder electrode material, and to prepare a positive electrode mixture that has an appropriate viscosity despite containing the PVdF at a high concentration and thus produce an electrode exhibiting an excellent characteristic with high productivity.

In addition, in a secondary battery using a conventional binder, when the secondary battery is stored at a high temperature, a polar group of the binder may be decomposed to increase the resistance. Because the PVdF of the present disclosure has an appropriately adjusted content of the pentenoic acid unit, the influence caused by the decomposition of the polar group in a high temperature environment is suppressed. Therefore, the PVdF of the present disclosure can be used to form an electrode in which an electrode material layer and a metal foil (current collector) are sufficiently adhered to each other and to create a secondary battery that is unlikely to increase in the resistance value even when stored at a high temperature.

The rate of increase in the resistance value of a secondary battery can be determined, for example, by the following method. A secondary battery (cell) placed in a constant-temperature vessel at 25° C. is charged to 4.4 V by a constant current-constant voltage method at a 0.5 C to 0.05 C rate, and then the initial resistance value is measured using an alternating current impedance measuring instrument. Next, the cell is stored in a constant-temperature vessel at 40° C. for 1 week, then placed in a constant-temperature vessel at 25° C. for 3 hours to lower the cell temperature to 25° C., and then the resistance value of the cell after an endurance test is measured. The average value of the resistance values of 5 cells is used as the measured value to determine the rate (%) of increase in the resistance value after the endurance test to the initial resistance value: ((resistance value after endurance test−initial resistance value)/initial resistance value×100).

In addition, in a secondary battery using a conventional binder, when the secondary battery is repeatedly charged and discharged, the powder electrode material may peel off from the electrode material layer to decrease the discharge capacity. Because the PVdF of the present disclosure has an appropriately adjusted content of the pentenoic acid unit, the PVdF of the present disclosure can be used to create a secondary battery (secondary battery having a high capacity retention rate) in which, even after repeated charge and discharge, the powder electrode material is unlikely to peel off from the electrode material layer and a sufficient discharge capacity is retained.

The capacity retention rate of a secondary battery can be evaluated, for example, by the following method. With a secondary battery sandwiched between plates and pressurized, the secondary battery is subjected to constant current-constant voltage charge (hereinafter referred to as CC/CV charge) (0.1 C cut) to 4.2 V at a current corresponding to 0.5 C at 25° C. and then discharged to 3.0 V at a constant current of 0.5 C, and this procedure is counted as 1 cycle, and the initial discharge capacity is determined from the discharge capacity at the third cycle. Here, 1 C represents a current value for discharging the reference capacity of a battery in 1 hour, and, for example, 0.5 C represents a current value equal to ½ thereof. A 300-cycle cycle test is carried out at an operating voltage of 3.0 to 4.2 V under the same conditions as above. The discharge capacity at the 300th cycle when the initial discharge capacity at the third cycle is 100% is defined as the capacity retention rate.

The content of the VdF unit of the PVdF is 95.0 to 99.99 mol %, preferably more than 95.0 mol %, more preferably 97.0 mol % or more, further preferably 98.0 mol % or more, particularly preferably 98.5 mol % or more, most preferably 99.0 mol % or more, and preferably 99.95 mol % or less, based on all monomer units of the PVdF. When the content of the VdF unit is within the above range, the electrolytic solution swelling resistance and the adhesion to a metal foil can be further improved, and an electrode having superior flexibility can be formed.

The content of the pentenoic acid unit of the PVdF is 0.01 to 5.0 mol %, preferably less than 5.0 mol %, more preferably 3.0 mol % or less, further preferably 2.0 mol % or less, particularly preferably 1.5 mol % or less, most preferably 1.0 mol % or less, and preferably 0.05 mol % or more, based on all monomer units of the PVdF. When the content of the pentenoic acid unit is within the above range, the electrolytic solution swelling resistance and the adhesion to a metal foil can be further improved, and an electrode having superior flexibility can be formed.

In the present disclosure, the formulation of a PVdF can be measured, for example, by $^{19}F$-NMR measurement. In addition, the content of the pentenoic acid unit of the PVdF can be measured by $^1$H-NMR measurement using the esterified PVdF after esterifying the carboxyl group (—COOY) of the pentenoic acid unit.

The PVdF may further contain a fluorinated monomer unit excluding the VdF unit. An electrode having superior flexibility can be formed by further containing a fluorinated monomer unit in the PVdF.

Examples of the fluorinated monomer include tetrafluoroethylene (TFE), vinyl fluoride, trifluoroethylene, chlorotrifluoroethylene (CTFE), fluoroalkyl vinyl ether, hexafluoropropylene (HFP), (perfluoroalkyl)ethylene, 2,3,3,3-tetrafluoropropene, and trans-1,3,3,3-tetrafluoropropene.

The fluorinated monomer is preferably at least one selected from the group consisting of CTFE, HFP, fluoroalkyl vinyl ether, and 2,3,3,3-tetrafluoropropene, more preferably at least one selected from the group consisting of CTFE, HFP, and fluoroalkyl vinyl ether, and further preferably at least one selected from the group consisting of HFP and fluoroalkyl vinyl ether, from the viewpoint of being able to form an electrode having superior flexibility.

The fluorovinyl ether is preferably a fluoroalkyl vinyl ether having a fluoroalkyl group having 1 to 5 carbon atoms, and more preferably at least one selected from the group consisting of perfluoro(methyl vinyl ether), perfluoro(ethyl vinyl ether), and perfluoro(propyl vinyl ether).

The PVdF preferably does not contain a TFE unit from the viewpoint of further improving the electrolytic solution swelling resistance and the adhesion to a metal foil.

The content of the fluorinated monomer unit of the PVdF is preferably 0 to 4.99 mol %, more preferably 0.01 mol % or more, further preferably 0.05 mol % or more, and more preferably 1.95 mol % or less, further preferably 0.95 mol % or less, based on all monomer units of the PVdF.

The PVdF may further contain a non-fluorinated monomer unit excluding the pentenoic acid unit represented by formula (1). Examples of the non-fluorinated monomer include ethylene and propylene.

The weight average molecular weight, in terms of polystyrene, of the PVdF is preferably 50,000 to 2,000,000, more preferably 80,000 or more, further preferably 100,000 or more, particularly preferably 200,000 or more, and more preferably 1,900,000 or less, further preferably 1,700,000 or less, particularly preferably 1,500,000 or less, from the viewpoint of being able to prepare an electrode mixture having an appropriate viscosity and having excellent coating performance while ensuring sufficient adhesion to a metal foil. The weight average molecular weight can be measured by gel permeation chromatography (GPC) using N,N-dimethylformamide as a solvent.

The number average molecular weight, in terms of polystyrene, of the PVdF is preferably 20,000 to 1,500,000, more preferably 40,000 or more, further preferably 70,000 or more, particularly preferably 140,000 or more, and more preferably 1,400,000 or less, further preferably 1,200,000 or less, particularly preferably 1,100,000 or less, from the viewpoint of being able to prepare an electrode mixture having an appropriate viscosity and having excellent coating performance while ensuring sufficient adhesion to a metal foil. The number average molecular weight can be measured by gel permeation chromatography (GPC) using dimethylformamide as a solvent.

When a conventional PVdF is used as a binder, the following tendency is observed: the higher the molecular weight of the PVdF, the better the adhesion of the electrode material layer to a metal foil. On the other hand, in the conventional PVdF, the following tendency is observed: the higher the molecular weight, the higher the viscosity of the electrode mixture and the lower the coating performance of the electrode mixture. The PVdF of the present disclosure makes it possible to prepare an electrode mixture that can form an electrode material layer exhibiting sufficient adhesion to a metal foil and that has an appropriate viscosity and has excellent coating performance. Further, when the PVdF of the present disclosure has a weight average molecular weight or a number average molecular weight within the above range, it is possible to achieve both high adhesion of the electrode material layer to a metal foil and excellent coating performance of the electrode mixture at an even higher level.

For example, the PVdF of the present disclosure can be used as a binder to prepare an electrode mixture having a viscosity comparable to that of the conventional electrode mixture and to form an electrode material layer exhibiting adhesion to a metal foil, even when increasing the content of the powder electrode material and the content of the binder in the electrode mixture and decreasing the amount of the non-aqueous solvent as compared with the conventional electrode mixture without changing the ratio between the amount of the powder electrode material and the amount of the binder. Therefore, the PVdF of the present disclosure can be used as a binder to form an electrode exhibiting an excellent characteristic and to realize improvement in productivity of the electrode and reduction in cost of the non-aqueous solvent.

The solution viscosity of the PVdF is preferably 10 to 4,000 mPa·s, more preferably 50 mPa·s or more, further preferably 100 mPa·s or more, particularly preferably 150 mPa·s or more, and more preferably 3,000 mPa·s or less, further preferably 2,000 mPa·s or less, particularly preferably 1,500 mPa·s or less, from the viewpoint of being able to further improve the adhesion to a metal foil and prepare an electrode mixture having an appropriate viscosity and having excellent coating performance. The solution viscosity of the PVdF is the viscosity of an N-methyl-2-pyrrolidone (NMP) solution containing 5% by mass of the PVdF. The viscosity of the NMP solution can be measured at 25° C. using a B-type viscometer.

The electrode mixture having an appropriate viscosity is not only excellent in coating performance, but also easy to feed, and good dispersibility of the powder electrode material in the electrode mixture can be obtained. Therefore, the electrode mixture having an appropriate viscosity can shorten the time required for feeding, the powder electrode material is unlikely to aggregate during feeding and storage, and the viscosity after feeding or storage is also easy to readjust. In addition, for the electrode mixture having an appropriate viscosity, an appropriate shear force can be easily given to the electrode mixture by stirring, and thus the powder electrode material can be easily dispersed in a non-aqueous solvent. When the PVdF of the present disclosure has a solution viscosity within the above range, an electrode mixture having an appropriate viscosity and excellent coating performance can be more easily prepared.

The melting point of the PVdF is preferably 100 to 240° C. The melting point can be determined as the temperature corresponding to the maximum value on the heat of fusion curve when the temperature is raised at a rate of 10° C./min using a differential scanning calorimetry (DSC) apparatus.

The storage elastic modulus of the PVdF at 30° C. is preferably 2,000 MPa or less and more preferably 1,800 MPa or less.

The storage elastic modulus of the PVdF at 60° C. is preferably 1,500 MPa or less and more preferably 1,300 MPa or less.

The storage elastic modulus of the PVdF at 30° C. is preferably 1,000 MPa or more and more preferably 1,100 MPa or more.

The storage elastic modulus of the PVdF at 60° C. is preferably 600 MPa or more and more preferably 700 MPa or more.

When the storage elastic modulus of the PVdF at 30° C. or 60° C. is within the above range, an electrode that has improved flexibility of the PVdF and that is unlikely to crack when the PVdF of the present disclosure is used as a binder can be easily formed.

The storage elastic modulus is measured values at 30° C. and 60° C. when a sample having a length of 30 mm, a width of 5 mm, and a thickness of 50 to 100 μm is measured under conditions of tensile mode, a grip width of 20 mm, a measurement temperature of −30° C. to 160° C., a temperature-increasing rate of 2° C./min, and a frequency of 1 Hz by dynamic viscoelasticity measurement using Dynamic Viscoelastic Analyzer DVA220 manufactured by IT Measurement Control.

The measurement sample can be created, for example, by casting a solution obtained by dissolving the PVdF in N-methyl-2-pyrrolidone (NMP) such that the concentration is 10 to 20% by mass onto a glass plate, drying the cast solution at 100° C. for 12 hours and further drying the same at 100° C. for 12 hours under vacuum, and cutting the resulting film having a thickness of 50 to 100 μm into a length of 30 mm and a width of 5 mm.

The state of distribution of the pentenoic acid unit in the main chain of the PVdF is not limited, and the pentenoic acid unit is preferably distributed as randomly as possible from the viewpoint of further improving the adhesion to a metal foil, the electrolytic solution swelling resistance, and the flexibility and also improving the heat resistance. The "fraction of randomly distributed pentenoic acid units," which represents the proportion of randomly distributed pentenoic acid units to the total number of pentenoic acid units in the PVdF, is preferably 5% or more, more preferably 10% or more, and further preferably 15% or more.

The fraction of randomly distributed pentenoic acid units can be calculated according to the following expression.

(Fraction (%))=(average number of pentenoic acid unit sequences (%))/(average total number of pentenoic acid units (%))×100

In the expression, the pentenoic acid unit sequence can be measured, for example, by $^{19}$F-NMR measurement and $^{1}$H-NMR measurement.

The pentenoic acid unit sequence is an isolated pentenoic acid unit included between two VdF units, and the larger the number of pentenoic acid unit sequences, the higher the fraction of randomly distributed pentenoic acid units. When the pentenoic acid units are completely randomly distributed, the fraction of randomly distributed pentenoic acid units is 100% because the average number of pentenoic acid unit sequences is equal to the average total number of the pentenoic acid units.

The PVdF of the present disclosure can be produced by polymerizing a monomer mixture including at least VdF and a pentenoic acid represented by formula (1). Examples of a polymerization method that can be adopted include suspension polymerization, emulsion polymerization, and solution polymerization, and suspension polymerization and emulsion polymerization are preferable from the viewpoint of ease of post-treatment and the like.

In the above polymerization, a polymerization initiator, a surfactant, a chain transfer agent, and a solvent can be used, and a conventionally known one can be used for each thereof. The polymerization initiator may be an oil-soluble radical polymerization initiator or a water-soluble radical polymerization initiator.

In some embodiments, the oil-soluble radical polymerization initiator is a known oil-soluble peroxide, and typical examples thereof include:

a dialkyl peroxycarbonate such as di-normal propyl peroxydicarbonate, diisopropyl peroxydicarbonate, or di-sec-butyl peroxydicarbonate;

a peroxyester such as t-butyl peroxyisobutyrate, t-butyl peroxypivalate, t-hexyl peroxy-2-ethylhexanoate, t-butyl peroxy-2-ethylhexanoate, or 1,1,3,3-tetramethylbutyl peroxy-2-ethylhexanoate;

a dialkyl peroxide such as di-t-butyl peroxide; and a di[fluoro(or fluorochloro)acyl] peroxide.

Examples of the di[fluoro(or fluorochloro)acyl] peroxide include a diacyl peroxide represented by $[(RfCOO)—]_2$ wherein Rf is a perfluoroalkyl group, an ω-hydroperfluoroalkyl group, or a fluorochloroalkyl group.

Examples of the di[fluoro(or fluorochloro)acyl] peroxide include di(ω-hydro-dodecafluorohexanoyl) peroxide, di(ω-hydro-tetradecafluoroheptanoyl) peroxide, di(ω-hydro-hexadecafluorononanoyl) peroxide, di(perfluorobutyryl) peroxide, di(perfluoropaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide, and di(undecachlorotriacontafluorodocosanoyl) peroxide.

In some embodiments, the water-soluble radical polymerization initiator is a known water-soluble peroxide, and examples thereof include an ammonium salt, a potassium salt, or a sodium salt of persulfuric acid, perboric acid, perchloric acid, perphosphoric acid, percarbonic acid, or the like, an organic peroxide such as disuccinic acid peroxide or diglutaric acid peroxide, t-butyl permaleate, and t-butyl hydroperoxide. A reducing agent such as a sulfite may be used in combination with a peroxide, and in some embodiments, the amount thereof used is 0.1 to 20 times that of the peroxide.

The surfactant may be a known surfactant, and examples of the surfactant that can be used include a nonionic surfactant, an anionic surfactant, and a cationic surfactant. Among these, a fluorine-containing anionic surfactant is preferable, and a linear or branched fluorine-containing anionic surfactant having 4 to 20 carbon atoms that may include an ether bond, that is, may have an oxygen atom inserted between carbon atoms, is more preferable. The amount of the surfactant added based on the solvent is preferably 50 to 5,000 ppm.

Examples of the chain transfer agent include a hydrocarbon such as ethane, isopentane, n-hexane, or cyclohexane; an aromatic such as toluene or xylene; a ketone such as acetone; an acetic acid ester such as ethyl acetate or butyl acetate; an alcohol such as methanol or ethanol; a mercaptan such as methyl mercaptan; and a halogenated hydrocarbon such as carbon tetrachloride, chloroform, methylene chloride, or methyl chloride. The amount of the chain transfer agent added can vary depending on the magnitude of the chain transfer constant of the chain transfer agent, and is usually in the range of 0.01 to 20% by mass based on the solvent.

Examples of the solvent include water and a mixed solvent of water and an alcohol.

In polymerization such as suspension polymerization, a fluorinated solvent may be used in addition to water. Examples of the fluorinated solvent include a hydrochlorofluoroalkane such as $CH_3CClF_2$, $CH_3CCl_2F$, $CF_3CF_2CCl_2H$, or $CF_2ClCF_2CFHCl$; a chlorofluoroalkane such as $CF_2ClCFClCF_2CF_3$ or $CF_3CFClCFClCF_3$; a perfluoroalkane such as perfluorocyclobutane, $CF_3CF_2CF_2CF_3$, $CF_3CF_2CF_2CF_2CF_3$, or $CF_3CF_2CF_2CF_2CF_2CF_3$; a hydrofluorocarbon such as $CF_2HCF_2CF_2CF_2H$, $CF_3CFHCF_2CF_2CF_3$, $CF_3CF_2CF_2CF_2CF_2H$, $CF_3CF_2CFHCF_2CF_3$, $CF_3CFHCFHCF_2CF_3$, $CF_2HCF_2CF_2CF_2CF_2H$, $CF_2HCFHCF_2CF_2CF_3$, $CF_3CF_2CF_2CF_2CF_2CF_2H$, $CF_3CH$ $(CF_3)$ $CF_3CF_2CF_3$, $CF_3CF$ $(CF_3)$ $CFHCF_2CF_3$, $CF_3CF$ $(CF_3)$ $CFHCFHCF_3$, $CF_3CH$ $(CF_3)$ $CFHCF_2CF_3$, $CF_2HCF_2CF_2CF_2CF_2CF_2H$, $CF_3CF_2CF_2CF_2CH_2CH_3$, or $CF_3CH_2CF_2CH_3$; a (perfluoroalkyl) alkyl ether such as $F(CF_2)_4OCH_3$, $F(CF_2)_4OC_2H_5$, $(CF_3)_2CFOCH_3$, or $F(CF_2)_3OCH_3$; and a hydrofluoroalkyl ether such as $CF_3CH_2OCF_2CHF_2$, $CHF_2CF_2CH_2OCF_2CHF_2$, or $CF_3CF_2CH_2OCF_2CHF_2$, and among these, a perfluoroalkane is preferable. The amount of the fluorinated solvent used is preferably 10 to 100% by mass based on the solvent from the viewpoint of suspending performance and economy.

The polymerization temperature and the polymerization pressure are appropriately determined according to the type and amount of the solvent used and other polymerization conditions such as the vapor pressure and the polymerization temperature.

From the viewpoint of being able to efficiently produce the PVdF, it is also preferable to polymerize a monomer mixture including at least VdF and a pentenoic acid represented by formula (1) under a condition under which VdF is in a supercritical state. The critical temperature of VdF is 30.1° C., and the critical pressure is 4.38 MPa.

From the viewpoint of being able to efficiently produce PVdF, it is also preferable to supply a monomer mixture to a reactor such that the density of the monomer mixture in the reactor is sufficiently high. The density of the monomer mixture in the reactor at the initial polymerization temperature is preferably 0.20 g/$cm^3$ or more, more preferably 0.23 g/$cm^3$ or more, and further preferably 0.25 g/$cm^3$ or more; and the upper limit thereof is not limited, and if the density is too high, the pressure change in the reactor due to a change in temperature in the reactor tends to be too large, and thus the upper limit is preferably 0.70 g/$cm^3$ or less from the viewpoint of safe production. The density of the monomer mixture in the reactor can be determined by dividing the amount (g) of the monomer mixture supplied to the reactor by the value obtained by subtracting the volume ($cm^3$) of water from the internal volume ($cm^3$) of the reactor.

In suspension polymerization using water as a dispersion medium, a suspending agent such as methyl cellulose, methoxylated methyl cellulose, propoxylated methyl cellulose, hydroxyethyl cellulose, hydroxypropyl cellulose, polyvinyl alcohol, polyethylene oxide, or gelatin can be added and used in the range of 0.005 to 1.0% by mass and preferably 0.01 to 0.4% by mass based on water.

Examples of the polymerization initiator that can be used in this case include diisopropyl peroxydicarbonate, di-normal propyl peroxydicarbonate, di-normal heptafluoropropyl peroxydicarbonate, isobutyryl peroxide, di(chlorofluoroacyl) peroxide, and di(perfluoroacyl) peroxide. The amount thereof used is preferably 0.001 to 5% by mass based on the total amount of the monomers.

In addition, the degree of polymerization of the polymer obtained may be regulated by adding a chain transfer agent such as ethyl acetate, methyl acetate, acetone, methanol, ethanol, n-propanol, acetaldehyde, propyl aldehyde, ethyl propionate, or carbon tetrachloride. The amount thereof used is usually 0.001 to 5% by mass and preferably 0.005 to 3% by mass based on the total amount of the monomers.

The total amount of the monomers placed is such that the mass ratio of the total amount of monomers: water is 2:1 to 1:10 and preferably 1:1 to 1:5.

The above PVdF can be suitably utilized as a binder. An electrode mixture containing the above PVdF can be used as a binder to foam an electrode material layer having excellent adhesion to a metal foil, electrolytic solution swelling resistance, and flexibility.

The binder of the present disclosure contains the above PVdF. Because the binder of the present disclosure contains the above PVdF, the binder of the present disclosure has excellent adhesion to a metal foil, electrolytic solution swelling resistance, and flexibility. In addition, an electrode mixture containing the binder of the present disclosure can be used to foam an electrode material layer having excellent adhesion to a metal foil, electrolytic solution swelling resistance, and flexibility.

The binder of the present disclosure may contain a polymer other than the above PVdF. Examples of the polymer other than the above PVdF include a fluoropolymer excluding the above PVdF, polymethacrylate, polymethyl methacrylate, polyacrylonitrile, polyimide, polyimide, polyamideimide, polycarbonate, styrene elastomer, and butadiene elastomer.

The binder of the present disclosure preferably contains a VdF polymer excluding the above PVdF as a polymer other than the above PVdF. Examples of the VdF polymer include a VdF homopolymer and a polymer containing a VdF unit and a unit based on a monomer copolymerizable with VdF, provided that the monomer excludes VdF and the pentenoic acid represented by formula (1).

The VdF polymer preferably contains a VdF unit and a unit based on a monomer copolymerizable with VdF, provided that the monomer excludes VdF and the pentenoic acid represented by formula (1), from the viewpoint of being able to obtain an electrode mixture which has further improved electrolytic solution swelling resistance, adhesion of the binder to a metal foil, and flexibility and which is unlikely to increase in viscosity.

Examples of the monomer copolymerizable with VdF include a fluorinated monomer and a non-fluorinated monomer.

The fluorinated monomer excluding the VdF is preferably at least one selected from the group consisting of tetrafluoroethylene (TFE), vinyl fluoride, trifluoroethylene, chlorotrifluoroethylene (CTFE), fluoroalkyl vinyl ether, hexafluoropropylene (HFP), (perfluoroalkyl)ethylene, 2,3,3,3-tetrafluoropropene, and trans-1,3,3,3-tetrafluoropropene, more preferably at least one selected from the group consisting of TFE, CTFE, and HFP, further preferably at least one selected from the group consisting of FTE and HFP, from the viewpoint of being able to obtain an electrode mixture which has further improved adhesion of the binder to a metal foil, electrolytic solution swelling resistance, and flexibility and which is more unlikely to increase in viscosity, and particularly preferably TFE in that it is possible to suppress swelling due to an electrolytic solution and improve a battery characteristic.

The fluorinated monomer unit excluding the VdF unit may or may not have a polar group.

Examples of the non-fluorinated monomer include a non-fluorinated monomer having no polar group such as ethylene or propylene, and a non-fluorinated monomer having a polar group (hereinafter sometimes referred to as a polar group-containing monomer). When a non-fluorinated monomer having a polar group is used, the polar group is introduced into the VdF polymer, and this further improves the adhesion of the binder to a metal foil.

The VdF polymer may have a polar group, and this further improves the adhesion of the binder to a metal foil. The polar group is not limited as long as it is a functional group having polarity, and is preferably at least one selected from the group consisting of a carbonyl group-containing group, an epoxy group, a hydroxy group, a sulfonic acid group, a sulfuric acid group, a phosphoric acid group, an amino group, an amide group, and an alkoxy group, more preferably at least one selected from the group consisting of a carbonyl group-containing group, an epoxy group, and a hydroxy group, and further preferably a carbonyl group-containing group, from the viewpoint of further improving the adhesion of the binder to a metal foil. The hydroxy group does not include a hydroxy group constituting a part of the carbonyl group-containing group. In addition, the amino group is a monovalent functional group obtained by removing hydrogen from ammonia or a primary or secondary amine.

The carbonyl group-containing group is a functional group having a carbonyl group (—C(=O)—). The carbonyl group-containing group is preferably a group represented by the general formula: —COOR wherein R represents a hydrogen atom, an alkyl group, or a hydroxyalkyl group, or a carboxylic anhydride group, and more preferably a group represented by the general formula: —COOR, from the viewpoint of further improving the adhesion of the binder to a metal foil. The number of carbon atoms of each of the alkyl group and the hydroxyalkyl group is preferably 1 to 16, more preferably 1 to 6, and further preferably 1 to 3. Specific examples of the group represented by the general formula: —COOR include $—COOCH_2CH_2OH$, $—COOCH_2CH(CH_3)OH$, $—COOCH(CH_3)CH_2OH$, —COOH, $—COOCH_3$, and $—COOC_2H_5$. When the group represented by the general formula: —COOR is —COOH or includes —COOH, in some embodiments, —COOH is a carboxylate such as a metal carboxylate or ammonium carboxylate.

In addition, in some embodiments, the carbonyl group-containing group is a group represented by the general formula: —X—COOR wherein X represents an atomic group having a main chain composed of 1 to 20 atoms and having a molecular weight of 500 or less and R is a hydrogen atom, an alkyl group, or a hydroxyalkyl group. The number of carbon atoms of each of the alkyl group and the hydroxyalkyl group is preferably 1 to 16, more preferably 1 to 6, and further preferably 1 to 3.

The amide group is preferably a group represented by the general formula: —CO—NRR' wherein R and R' each independently represent a hydrogen atom or a substituted or unsubstituted alkyl group, or a bond represented by the general formula: —CO—NR"— wherein R" represents a hydrogen atom, a substituted or unsubstituted alkyl group, or a substituted or unsubstituted phenyl group.

The polar group can be introduced into the VdF polymer by polymerizing VdF and a polar group-containing monomer, or can be introduced into the VdF polymer by reacting a VdF polymer and a compound having the polar group, and from the viewpoint of productivity, it is preferable to polymerize VdF and a polar group-containing monomer.

Examples of the polar group-containing monomer include a hydroxyalkyl (meth)acrylate such as hydroxyethyl acrylate or 2-hydroxypropyl acrylate; an alkylidenemalonate ester such as dimethyl methylidenemalonate; a vinyl carboxyalkyl ether such as vinyl carboxymethyl ether or vinyl carboxyethyl ether; a carboxyalkyl (meth)acrylate such as 2-carboxyethyl acrylate or 2-carboxyethyl methacrylate; a (meth) acryloyloxyalkyl dicarboxylate ester such as acryloyloxyethyl succinate, acryloyloxypropyl succinate, methacryloyloxyethyl succinate, acryloyloxyethyl phthalate, or methacryloyloxyethyl phthalate; a monoester of an unsaturated dibasic acid such as monomethyl maleate ester, monoethyl maleate ester, monomethyl citraconate ester, or monoethyl citraconate ester; and a monomer (2) represented by formula (2):

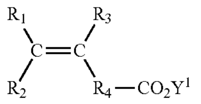

wherein $R^1$ to $R^3$ each independently represent a hydrogen atom or a hydrocarbon group having 1 to 8 carbon atoms, $R^4$ represents a single bond or a hydrocarbon group having 1 to 8 carbon atoms, and $Y^1$ represents an inorganic cation or an organic cation, provided that the monomer (2) excludes the pentenoic acid represented by formula (1).

The VdF polymer preferably contains a unit based on the monomer (2) represented by formula (2) as the polar group-containing monomer.

In formula (2), $Y^1$ represents an inorganic cation and/or an organic cation. Examples of the inorganic cation include a cation such as H, Li, Na, K, Mg, Ca, Al, or Fe. Examples of the organic cation include a cation such as $NH_4$, $NH_3R^5$, $NH_2R^5{}_2$, $NHR^5{}_3$, or $NR^5{}_4$ wherein $R^5$ independently represents an alkyl group having 1 to 4 carbon atoms. $Y^1$ is preferably H, Li, Na, K, Mg, Ca, Al, or $NH_4$, more preferably H, Li, Na, K, Mg, Al, or $NH_4$, further preferably H, Li, Al, or $NH_4$, and particularly preferably H. Specific examples of the inorganic cation and the organic cation are described by omitting their signs and valences for convenience.

In formula (2), $R^1$ to $R^3$ each independently represent a hydrogen atom or a hydrocarbon group having 1 to 8 carbon atoms. The hydrocarbon group is a monovalent hydrocarbon group. The hydrocarbon group preferably has 4 or less carbon atoms. Examples of the hydrocarbon group include an alkyl group, an alkenyl group, and an alkynyl group having the above number of carbon atoms, and a methyl group or an ethyl group is preferable. $R^1$ and $R^2$ are preferably each independently a hydrogen atom, a methyl group, or an ethyl group, and $R^3$ is preferably a hydrogen atom or a methyl group.

In formula (2), $R^4$ represents a single bond or a hydrocarbon group having 1 to 8 carbon atoms. The hydrocarbon group is a divalent hydrocarbon group. The hydrocarbon group preferably has 4 or less carbon atoms. Examples of the hydrocarbon group include an alkylene group and an alkenylene group having the above number of carbon atoms, and among these, at least one selected from the group consisting of a methylene group, an ethylene group, an ethylidene group, a propylidene group, and an isopropylidene group is preferable, and a methylene group is more preferable.

The monomer (2) is preferably at least one selected from the group consisting of (meth)acrylic acid and a salt thereof, vinylacetic acid (3-butenoic acid) and a salt thereof, 3-pentenoic acid and a salt thereof, 3-hexenoic acid and a salt thereof, 4-heptenoic acid and a salt thereof, and 5-hexenoic acid and a salt thereof.

When a VdF polymer is reacted with a compound having the polar group to introduce the polar group into the VdF polymer, the compound having the polar group may be the polar group-containing monomer or a silane-based coupling agent or a titanate-based coupling agent having a group that is reactive with the VdF polymer and a hydrolyzable group. The hydrolyzable group is preferably an alkoxy group. When a coupling agent is used, the coupling agent can be reacted with a VdF polymer dissolved or swollen in a solvent to add the polar group to the VdF polymer.

The VdF polymer may also be obtained by partially dehydrofluorinating a VdF polymer using a base and then further reacting the partially dehydrofluorinated VdF polymer with an oxidizing agent. Examples of the oxidizing agent include hydrogen peroxide, a hypochlorite, palladium halide, chromium halide, an alkali metal permanganate, a peracid compound, an alkyl peroxide, and an alkyl persulfate.

The content of the polar group-containing monomer unit of the VdF polymer is preferably 0.001 to 8.0 mol %, more preferably 0.01 to 5.0 mol %, and further preferably 0.30 to 3.0 mol % based on all monomer units of the VdF polymer, from the viewpoint of further improving the adhesion of the binder to a metal foil.

In the present disclosure, the formulation of the VdF polymer can be measured, for example, by $^{19}$F-NMR measurement. When the VdF polymer contains a polar group-containing monomer unit, the content of the polar group-containing monomer unit in the VdF polymer, for example wherein the polar group is an acid group such as a carboxylic acid, can be measured by acid-base titration of the acid group.

The VdF polymer is preferably a polymer containing a VdF unit and a fluorinated monomer unit excluding the VdF unit. In addition to such a monomer unit, the VdF polymer may contain a non-fluorinated monomer unit such as a polar group-containing monomer unit.

The content of the VdF unit of the VdF polymer is preferably 57.0 to 99.9 mol %, more preferably 60.0 mol % or more, further preferably 63.0 mol % or more, and more preferably 99.5 mol % or less, based on all monomer units of the VdF polymer.

The content of the fluorinated monomer unit of the VdF polymer is preferably 0.1 to 43.0 mol %, more preferably 0.5 mol % or more, and more preferably 40.0 mol % or less, further preferably 37.0 mol % or less, based on all monomer units of the VdF polymer.

The VdF polymer also preferably contains a relatively small amount of a VdF unit and a relatively large amount of a fluorinated monomer unit. For example, the content of the VdF unit is preferably 57.0 mol % or more, more preferably 60.0 mol % or more, further preferably 63.0 mol % or more, and preferably 95.0 mol % or less, more preferably 90.0 mol % or less, further preferably 85.0 mol % or less, based on all monomer units of the VdF polymer. The content of the fluorinated monomer unit is preferably 5.0 mol % or more, more preferably 8.0 mol % or more, particularly preferably 10.0 mol % or more, most preferably 15.0 mol % or more, and preferably 43.0 mol % or less, more preferably 40.0 mol % or less, further preferably 38.0 mol % or less, particularly preferably 37.0 mol % or less, based on all monomer units of the VdF polymer.

The VdF polymer containing a relatively small amount of a VdF unit and a relatively large amount of a fluorinated monomer unit also preferably further contains a polar group-containing monomer unit. The content of the polar group-containing monomer unit is preferably 0.01 to 2.0 mol %, and more preferably 0.05 mol % or more, and more preferably 1.0 mol % or less, based on all monomer units of the VdF polymer.

The VdF polymer also preferably contains a relatively large amount of a VdF unit and a relatively small amount of a monomer unit copolymerizable with VdF. For example, the content of the VdF unit is preferably 92.0 to 99.9 mol %, more preferably 95.0 mol % or more, and more preferably 99.5 mol % or less, based on all monomer units of the VdF polymer. The content of the monomer unit copolymerizable with VdF is preferably 0.10 to 8.0 mol %, more preferably 0.50 mol % or more, and more preferably 5.0 mol % or less, based on all monomer units of the VdF polymer.

The weight average molecular weight, in terms of polystyrene, of the VdF polymer is preferably 50,000 to 3,000,000, more preferably 80,000 or more, further preferably 100,000 or more, particularly preferably 200,000 or more, and more preferably 2,400,000 or less, further preferably 2,200,000 or less, particularly preferably 2,000,000 or less. The weight average molecular weight can be measured by gel permeation chromatography (GPC) at 50° C. using dimethylformamide as a solvent.

The number average molecular weight, in terms of polystyrene, of the VdF polymer is preferably 20,000 to 1,500,000, more preferably 40,000 or more, further preferably 70,000 or more, particularly preferably 140,000 or more, and more preferably 1,400,000 or less, further preferably 1,200,000 or less, particularly preferably 1,100,000 or less. The number average molecular weight can be measured by gel permeation chromatography (GPC) at 50° C. using dimethylformamide as a solvent.

The melting point of the VdF polymer is preferably 100 to 240° C. The melting point can be determined as the temperature at the maximum value on the heat of fusion curve when the temperature is raised at a rate of 10° C./min using a differential scanning calorimetry (DSC) apparatus.

The VdF polymer preferably has a storage elastic modulus of 1,100 MPa or less at 30° C. and a storage elastic modulus of 500 MPa or less at 60° C. When the storage elastic modulus of the VdF polymer at 30° C. is 1,100 MPa or less and the storage elastic modulus thereof at 60° C. is 500 MPa or less, the flexibility further improves.

The storage elastic modulus of the VdF polymer at 30° C. is more preferably 800 MPa or less and further preferably 600 MPa or less.

The storage elastic modulus of the VdF polymer at 60° C. is more preferably 350 MPa or less.

The storage elastic modulus of the VdF polymer at 30° C. is preferably 100 MPa or more, more preferably 150 MPa or more, and further preferably 200 MPa or more.

The storage elastic modulus of the VdF polymer at 60° C. is preferably 50 MPa or more, more preferably 80 MPa or more, and further preferably 130 MPa or more.

The storage elastic modulus of the VdF polymer can be measured by the same method as the storage elastic modulus of the PVdF.

Examples of the VdF polymer include a VdF/TFE copolymer, a VdF/HFP copolymer, a VdF/2,3,3,3-tetrafluoropropene copolymer, a VdF/TFE/HFP copolymer, a VdF/TFE/2,3,3,3-tetrafluoropropene copolymer, a VdF/TFE/(meth)acrylic acid copolymer, a VdF/HFP/(meth)acrylic acid copolymer, a VdF/CTFE copolymer, a VdF/CTFE/TFE copolymer, a VdF/TFE/3-butenoic acid copolymer, a VdF/TFE/HFP/(meth)acrylic acid copolymer, a VdF/TFE/HFP/3-butenoic acid copolymer, a VdF/TFE/2-carboxyethyl acrylate copolymer, a VdF/TFE/HFP/2-carboxyethyl acrylate copolymer, a VdF/TFE/acryloyloxyethyl succinate copolymer, and a VdF/TFE/HFP/acryloyloxyethyl succinate copolymer.

Among these, the VdF polymer is preferably at least one selected from the group consisting of a VdF/TFE copolymer, a VdF/HFP copolymer, a VdF/2,3,3,3-tetrafluoropropene copolymer, a VdF/TFE/HFP copolymer, a VdF/TFE/2,3,3,3-tetrafluoropropene copolymer, a VdF/TFE/(meth)acrylic acid copolymer, a VdF/HFP/(meth)acrylic acid copolymer, a VdF/CTFE copolymer, and a VdF/CTFE/TFE copolymer.

The VdF/TFE copolymer contains a VdF unit and a TFE unit. The content of the VdF unit is preferably 50 to 95 mol %, more preferably 55 mol % or more, further preferably 60 mol % or more, and more preferably 92 mol % or less, further preferably 89 mol % or less, based on all monomer units of the VdF/TFE copolymer. The content of the TFE unit is preferably 50 to 5 mol %, more preferably 45 mol % or less, further preferably 40 mol % or less, and more preferably 8 mol % or more, further preferably 11 mol % or more, based on all monomer units of the VdF/TFE copolymer.

In some embodiments, the VdF/TFE copolymer includes a unit based on a monomer copolymerizable with VdF and TFE provided that the monomer excludes VdF, TFE, and the pentenoic acid represented by formula (1), in addition to a VdF unit and a TFE unit. The content of the unit based on a monomer copolymerizable with VdF and TFE is preferably 3.0 mol % or less based on all monomer units of the VdF/TFE copolymer from the viewpoint of the electrolytic solution swelling resistance.

Examples of the monomer copolymerizable with VdF and TFE include the above fluorinated monomer and the above non-fluorinated monomer. Among these, the monomer copolymerizable with VdF and TFE is preferably at least one selected from the group consisting of a fluorinated monomer and a polar group-containing monomer, and more preferably at least one selected from the group consisting of HFP, 2,3,3,3-tetrafluoropropene, and the monomer (2) excluding the pentenoic acid represented by formula (1).

The weight average molecular weight, in terms of polystyrene, of the VdF/TFE copolymer is preferably 50,000 to 2,000,000, more preferably 80,000 to 1,700,000, and further preferably 100,000 to 1,500,000.

The number average molecular weight, in terms of polystyrene, of the VdF/TFE copolymer is preferably 35,000 to 1,400,000, more preferably 40,000 to 1,300,000, and further preferably 50,000 to 1,200,000.

The VdF/HFP copolymer contains a VdF unit and an HFP unit. The content of the VdF unit is preferably 80 to 98 mol %, more preferably 83 mol % or more, further preferably 85 mol % or more, and more preferably 97 mol % or less, further preferably 96 mol % or less, based on all monomer units of the VdF/HFP copolymer. The content of the HFP unit is preferably 20 to 2 mol %, more preferably 17 mol % or less, further preferably 15 mol % or less, and more preferably 3 mol % or more, further preferably 4 mol % or more, based on all monomer units of the VdF/HFP copolymer.

In some embodiments, the VdF/HFP copolymer includes a unit based on a monomer copolymerizable with VdF and HFP provided that the monomer excludes VdF, HFP, and the pentenoic acid represented by formula (1), in addition to a VdF unit and an HFP unit. The content of the unit based on a monomer copolymerizable with VdF and HFP is preferably 3.0 mol % or less based on all monomer units of the VdF/HFP copolymer from the viewpoint of the electrolytic solution swelling resistance.

Examples of the monomer copolymerizable with VdF and HFP include the above fluorinated monomer and the above non-fluorinated monomer. Among these, the monomer copolymerizable with VdF and HFP is preferably at least one selected from the group consisting of a fluorinated monomer and a polar group-containing monomer, more preferably at least one selected from the group consisting of Th, 2,3,3,3-tetrafluoropropene, and the monomer (2) excluding the pentenoic acid represented by formula (1), and further preferably the monomer (2) excluding the pentenoic acid represented by formula (1).

The weight average molecular weight, in terms of polystyrene, of the VdF/HFP copolymer is preferably 50,000 to 2,000,000, more preferably 80,000 to 1,700,000, and further preferably 100,000 to 1,500,000.

The number average molecular weight, in terms of polystyrene, of the VdF/HFP copolymer is preferably 35,000 to 1,400,000, more preferably 40,000 to 1,300,000, and further preferably 50,000 to 1,200,000.

The VdF/CTE copolymer contains a VdF unit and a CTFE unit. The content of the VdF unit is preferably 80 to 98 mol %, more preferably 85 mol % or more, further preferably 90 mol % or more, and more preferably 97.5 mol % or less, further preferably 97 mol % or less, based on all monomer units of the VdF/CTFE copolymer. The content of the CTFE unit is preferably 20 to 2 mol %, more preferably 15 mol % or less, further preferably 10 mol % or less, and more preferably 2.5 mol % or more, further preferably 3 mol % or more, based on all monomer units of the VdF/CTFE copolymer.

In some embodiments, the VdF/CTFE copolymer includes a unit based on a monomer copolymerizable with VdF and CTE provided that the monomer excludes VdF, CTFE, and the pentenoic acid represented by formula (1), in addition to a VdF unit and a CTFE unit. The content of the unit based on a monomer copolymerizable with VdF and CTFE is preferably 3.0 mol % or less based on all monomer units of the VdF/CTFE copolymer from the viewpoint of the electrolytic solution swelling resistance.

Examples of the monomer copolymerizable with VdF and CTFE include the above fluorinated monomer and the above non-fluorinated monomer. Among these, the monomer copolymerizable with VdF and CTE is preferably at least one selected from the group consisting of a fluorinated monomer and a polar group-containing monomer, more preferably at least one selected from the group consisting of TFE, HFP, 2,3,3,3-tetrafluoropropene, and the monomer (2) excluding the pentenoic acid represented by formula (1), and further preferably TFE.

The weight average molecular weight, in terms of polystyrene, of the VdF/CTFE copolymer is preferably 50,000 to 2,000,000, more preferably 80,000 to 1,700,000, and further preferably 100,000 to 1,500,000.

The number average molecular weight, in terms of polystyrene, of the VdF/CTFE copolymer is preferably 35,000 to 1,400,000, more preferably 40,000 to 1,300,000, and further preferably 50,000 to 1,200,000.

The VdF/2,3,3,3-tetrafluoropropene copolymer contains a VdF unit and a 2,3,3,3-tetrafluoropropene unit. The content of the VdF unit is preferably 80 to 98 mol %, more preferably 85 mol % or more, further preferably 90 mol % or more, and more preferably 97.5 mol % or less, further preferably 97 mol % or less, based on all monomer units of the VdF/2,3,3,3-tetrafluoropropene copolymer. The content of the 2,3,3,3-tetrafluoropropene unit is preferably 20 to 2 mol %, more preferably 15 mol % or less, further preferably 10 mol % or less, and more preferably 2.5 mol % or more, further preferably 3 mol % or more, based on all monomer units of the VdF/2,3,3,3-tetrafluoropropene copolymer.

In some embodiments, the VdF/2,3,3,3-tetrafluoropropene copolymer includes a unit based on a monomer copolymerizable with VdF and 2,3,3,3-tetrafluoropropene provided that the monomer excludes VdF, 2,3,3,3-tetrafluoropropene, and the pentenoic acid represented by formula (1), in addition to a VdF unit and a 2,3,3,3-tetrafluoropropene unit. The content of the unit based on a monomer copolymerizable with VdF and 2,3,3,3-tetrafluoropropene is preferably 3.0 mol % or less based on all monomer units of the VdF/2,3,3,3-tetrafluoropropene copolymer from the viewpoint of the electrolytic solution swelling resistance.

Examples of the monomer copolymerizable with VdF and 2,3,3,3-tetrafluoropropene include the above fluorinated monomer and the above non-fluorinated monomer. Among these, the monomer copolymerizable with VdF and 2,3,3,3-tetrafluoropropene is preferably at least one selected from the group consisting of a fluorinated monomer and a polar group-containing monomer, and more preferably at least one selected from the group consisting of HFP, 2,3,3,3-tetrafluoropropene, and the monomer (2) excluding the pentenoic acid represented by formula (1).

The weight average molecular weight, in terms of polystyrene, of the VdF/2,3,3,3-tetrafluoropropene copolymer is preferably 50,000 to 2,000,000, more preferably 80,000 to 1,700,000, and further preferably 100,000 to 1,500,000.

The number average molecular weight, in terms of polystyrene, of the VdF/2,3,3,3-tetrafluoropropene copolymer is preferably 35,000 to 1,400,000, more preferably 40,000 to 1,300,000, and further preferably 50,000 to 1,200,000.

The mass ratio of the PVdF (A) and the VdF polymer (B), (A)/(B), in the binder is preferably 95/5 to 10/90, more preferably 90/10 or less, and more preferably 40/60 or more, further preferably 45/55 or more, particularly preferably 50/50 or more, from the viewpoint of being able to obtain an electrode mixture which has improved flexibility and which is unlikely to increase in viscosity.

The PVdF and the binder of the present disclosure can be suitably used as a material for forming a secondary battery. The PVdF and the binder of the present disclosure has excellent electrolytic solution swelling resistance and adhesion to a metal foil and can foam an electrode having excellent flexibility, and thus are suitable as a binder used for an electrode of a secondary battery. The PVdF and the binder of the present disclosure can also be used as a binder for coating a secondary battery separator. The PVdF and the binder of the present disclosure can be used to create a secondary battery which is unlikely to increase in the resistance value even when stored at a high temperature and further, in which a sufficient discharge capacity is retained even after repeated charge and discharge.

In some embodiments, the PVdF of the present disclosure is a PVdF for a secondary battery. In the present disclosure, PVdF for a secondary battery includes PVdF used for a positive electrode, a negative electrode, or a separator of a secondary battery.

In addition, in some embodiments, the binder of the present disclosure is a binder for a secondary battery. In the present disclosure, the binder for a secondary battery includes a binder used for a positive electrode, a negative electrode, or a separator of a secondary battery. The secondary battery is preferably a lithium ion secondary battery.

The PVdF or the binder of the present disclosure can also constitute an electrode mixture together with a powder electrode material, water, or a non-aqueous solvent. The secondary battery to which the PVdF or the binder of the present disclosure is applied includes a positive electrode in which a positive electrode mixture is held in a positive electrode current collector, a negative electrode in which a negative electrode mixture is held in a negative electrode current collector, and an electrolytic solution.

The electrode mixture of the present disclosure contains the above PVdF or binder, a powder electrode material, and water or a non-aqueous solvent. The electrode mixture of the present disclosure is an electrode mixture for a secondary battery in some embodiments and is an electrode mixture for a lithium ion secondary battery in other embodiments. Because the electrode mixture of the present disclosure contains the above PVdF or binder, the electrode mixture can be easily adjusted to have a viscosity suitable for coating of a current collector even when the PVdF or binder is contained in a high concentration, and has excellent electrolytic solution swelling resistance and adhesion to a metal foil, and can form an electrode having excellent flexibility. In addition, because the electrode mixture of the present disclosure contains the above PVdF or binder, even if the viscosity of the electrode mixture is adjusted to an appropriate viscosity to have excellent coating performance, it is possible to ensure sufficient adhesion to a metal foil (current collector) and a sufficient ability to hold a powder electrode material. In addition, the electrode mixture of the present disclosure can be used to create a secondary battery which is unlikely to increase in the resistance value even when stored at a high temperature and further, in which a sufficient discharge capacity is retained even after repeated charge and discharge.

The electrode mixture is a positive electrode mixture used for creating a positive electrode in some embodiments and is a negative electrode mixture used for creating a negative electrode in other embodiments, and is preferably a positive electrode mixture. The electrode material layer formed from the electrode mixture of the present disclosure is a positive electrode material layer in some embodiments and is a negative electrode material layer in other embodiments as long as it contains the above PVdF or binder and a powder electrode material.

The powder electrode material is a powder electrode material used for a battery, and preferably includes an electrode active material. The electrode active material is divided into a positive electrode active material and a negative electrode active material. In the case of a lithium ion secondary battery, the positive electrode active material is not limited as long as it can electrochemically absorb and desorb a lithium ion, and is preferably a lithium composite oxide and more preferably a lithium transition metal composite oxide. The positive electrode active material is also preferably a lithium-containing transition metal phosphate compound. The positive electrode active material is also preferably a substance containing lithium and at least one transition metal, such as a lithium transition metal composite oxide or a lithium-containing transition metal phosphate compound.

Preferable examples of the transition metal of the lithium transition metal composite oxide include V, Ti, Cr, Mn, Fe, Co, Ni, and Cu, and specific examples of the lithium transition metal composite oxide include a lithium-cobalt composite oxide such as $LiCoO_2$, a lithium-nickel composite oxide such as $LiNiO_2$, a lithium-manganese composite oxide such as $LiMnO_2$, $LiMn_2O_4$, or $Li_2MnO_3$, and compounds obtained by replacement of a part of the transition metal atoms mainly constituting these lithium transition metal composite oxides with another metal such as Al, Ti, V, Cr, Mn, Fe, Co, Li, Ni, Cu, Zn, Mg, Ga, Zr, or Si. Examples of the compounds obtained by replacement include a lithium-nickel-manganese composite oxide, a lithium-nickel-cobalt-aluminum composite oxide, a lithium-nickel-cobalt-manganese composite oxide, a lithium-manganese-aluminum composite oxide, and a lithium-titanium composite oxide, and more specific examples include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.5}Mn_{0.3}Co_{0.2}O_2$, $LiNi_{0.6}Mn_{0.2}Co_{0.2}O_2$, $LiNio_{0.8}Mn_{0.1}Co_{0.1}O_2$, $LiMn_{1.8}Al_{0.2}O_4$, $LiMn_{1.5}Ni_{0.5}O_4$, $Li_4Ti_5O_{12}$, and $LiNi_{0.82}Co_{0.15}Al_{0.03}O_2$.

Preferable examples of the transition metal of the lithium containing transition metal phosphate compound include V, Ti, Cr, Mn, Fe, Co, Ni, and Cu, and specific examples of the lithium-containing transition metal phosphate compound include an iron phosphate compound such as $LiFePO_4$, $Li_3Fe_2(PO_4)_3$, or $LiFeP_2O_7$, a cobalt phosphate compound such as $LiCoPO_4$, and compounds obtained by replacement of a part of the transition metal atoms mainly constituting these lithium transition metal phosphate compounds with another metal such as Al, Ti, V, Cr, Mn, Fe, Co, Li, Ni, Cu, Zn, Mg, Ga, Zr, Nb, or Si.

In particular, $LiCoO_2$, $LiNiO_2$, $LiMn_2O_4$, $LiNi_{0.82}Co_{0.15}Al_{0.03}O_2$, $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$, and $LiFePO_4$ are preferable from the viewpoint of high voltage, high energy density, charge/discharge cycle characteristics, or the like.

In addition, these positive electrode active materials used may each have a surface to which a substance different in formulation from the substance mainly constituting the positive electrode active material adheres. Examples of the surface adhering substance include an oxide such as aluminum oxide, silicon oxide, titanium oxide, zirconium oxide, magnesium oxide, calcium oxide, boron oxide, antimony oxide, or bismuth oxide, a sulfate such as lithium sulfate, sodium sulfate, potassium sulfate, magnesium sulfate, calcium sulfate, or aluminum sulfate, and a carbonate such as lithium carbonate, calcium carbonate, or magnesium carbonate.

These surface adhering substances can each be adhered to the surface of a positive electrode active material, for example, by a method involving dissolving or suspending the surface adhering substance in a solvent to add the resulting solution or suspension to the positive electrode active material by impregnation and drying the same, a method involving dissolving or suspending a surface adhering substance precursor in a solvent to add the resulting solution or suspension to the positive electrode active material by impregnation and then reacting these by heating or the like, or a method involving adding the surface adhering substance to a positive electrode active substance precursor and simultaneously calcining these.

The lower limit of the amount by mass of the surface adhering substance used is preferably 0.1 ppm or more, more preferably 1 ppm or more, and further preferably 10 ppm or more, and the upper limit thereof is preferably 20% or less, more preferably 10% or less, and further preferably 5% or less based on the positive electrode active material. The surface adhering substance can suppress the oxidation reaction of the non-aqueous electrolytic solution on the surface of the positive electrode active material and improve the battery life, and if the amount thereof adhered is too small, the effects thereof are not sufficiently developed, and if the amount is too large, the resistance may increase because the surface adhering substance inhibits the entry and exit of a lithium ion.

A particle of the positive electrode active material may have a blocky shape, a polyhedral shape, a spherical shape, an oval shape, a plate-like shape, a needle-like shape, a columnar shape, or the like as conventionally used, and among these, preferably, a primary particle aggregates to form a secondary particle that has a spherical shape or an oval shape. Usually, the active material in the electrode expands and contracts with the charge and discharge of an electrochemical element, and thus the stress thereof is likely to cause a deterioration such as destruction of the active material or disconnection of a conductive path. Because of this, an active material in which a primary particle aggregates to form a secondary particle is more preferable than a single particle active material containing only a primary particle because the former relaxes the stress of expansion and contraction and prevents a deterioration. In addition, a particle having a spherical shape or an oval shape is more preferable than an axially oriented particle such as a particle having a plate-like shape because the former particle is less oriented when an electrode is molded and thus the electrode also expands and contracts less during charge and discharge, and even when the former particle is mixed with a conductive agent in electrode creation, it is easy to mix the former particle uniformly.

The tap density of the positive electrode active material is usually 1.3 g/cm$^3$ or more, preferably 1.5 g/cm$^3$ or more, further preferably 1.6 g/cm$^3$ or more, and most preferably 1.7 g/cm$^3$ or more. If the tap density of the positive electrode active material is lower than the above lower limit, when foaming a positive electrode material layer, the required amount of a dispersion medium increases, the required amount of a conductive agent or a binder increases, and the rate of filling of the positive electrode material layer with the positive electrode active material may be limited to limit the battery capacity. A high density positive electrode material layer can be formed by using a metal composite oxide powder having a high tap density. In general, a larger tap density is more preferable, and there is no particular upper limit thereon, and if the tap density is too large, the diffusion of a lithium ion using a non-aqueous electrolytic solution as a medium in the positive electrode material layer may be rate-determining to easily reduce the load characteristics, and thus the upper limit of the tap density is usually 2.5 g/cm$^3$ or less and preferably 2.4 g/cm$^3$ or less.

The density determined as follows is defined as the tap density of the positive electrode active material: a sample is passed through a sieve having an opening size of 300 μm, dropped into a tapping cell of 20 cm$^3$ to fill the cell volume, then tapping is carried out at a stroke length of 10 mm 1000 times using a powder density measuring instrument (for example, Tap Denser manufactured by Seishin Enterprise Co., Ltd.), and the density is determined from the volume at that time and the weight of the sample.

The median diameter d50 (secondary particle size when a primary particle aggregates to foam a secondary particle) of the particle of the positive electrode active material is usually 0.1 μm or more, preferably 0.5 μm or more, more preferably 1 μm or more, most preferably 3 μm or more, and usually 20 μm or less, preferably 18 μm or less, more preferably 16 μm or less, most preferably 15 μm or less. If d50 is lower than the above lower limit, it may not be possible to obtain a high bulk density product, and if d50 exceeds the upper limit, for example the following problems may occur: it takes time to diffuse lithium in the particles, resulting in reduction in battery performance, and when creating a positive electrode of a battery, that is, slurrying an active material and a conductive agent, a binder, or the like using a solvent to apply the resulting slurry in the form of a thin film, a streak is formed. Here, mixing of two or more positive electrode active materials having different median diameters d50 can also further improve the filling property when creating a positive electrode.

The median diameter d50 in the present disclosure is measured using a known laser diffraction/scattering type particle size distribution measurement apparatus. When LA-920 manufactured by HORIBA, Ltd. is used as a particle size distribution analyzer, d50 is measured by using a 0.1% by mass sodium hexametaphosphate aqueous solution as a dispersion medium used for the measurement, carrying out ultrasonic dispersion for 5 minutes, and then setting the measurement refractive index to 1.24.

When a primary particle aggregates to form a secondary particle, the average primary particle size of the positive electrode active material is usually 0.01 μm or more, preferably 0.05 μm or more, further preferably 0.08 μm or more, most preferably 0.1 μm or more, and usually 3 μm or less, preferably 2 μm or less, further preferably 1 μm or less, most preferably 0.6 μm or less. If the average primary particle size exceeds the above upper limit, it is difficult to foam a spherical secondary particle, which adversely affects the powder filling property and greatly reduces the specific surface area, and thus battery performance such as output characteristics may be likely to decrease. On the contrary, if the average primary particle size is lower than the above lower limit, a crystal is usually underdeveloped, which may cause a problem such as poor charge/discharge reversibility. The primary particle size is measured by observation using a scanning electron microscope (SEM). Specifically, the primary particle size is determined by obtaining the value of the longest segment of a straight line in the horizontal direction formed by the left and right boundary lines of a primary particle on a photograph at a magnification of 10,000 times for each of any 50 primary particles and averaging the obtained values.

The BET specific surface area of the positive electrode active material is 0.2 $m^2/g$ or more, preferably 0.3 $m^2/g$ or more, further preferably 0.4 $m^2/g$ or more, and 4.0 $m^2/g$ or less, preferably 2.5 $m^2/g$ or less, further preferably 1.5 $m^2/g$ or less. If the BET specific surface area is smaller than this range, the battery performance easily decreases, and if the BET specific surface area is larger than this range, the tap density does not easily increase, and a problem may easily occur in the coating performance when forming the positive electrode material layer.

The BET specific surface area is defined as a value determined using a surface area meter (for example, a fully automatic surface area measurement apparatus manufactured by Ohkura Riken) by pre-drying a sample at 150° C. for 30 minutes under a nitrogen flow and then measuring the sample by the nitrogen adsorption BET single point method according to the gas flow method using a nitrogen helium mixed gas accurately adjusted such that the value of nitrogen pressure relative to atmospheric pressure is 0.3.

The method for producing a positive electrode active material may be a general method used as a method for producing an inorganic compound. In particular, various methods can be considered for creating a spherical or oval active material, and examples thereof include a method for obtaining an active material by dissolving or pulverizing and dispersing a transition metal raw material such as a transition metal nitrate or sulfate and optionally a raw material of another element in a solvent such as water and regulating the pH while stirring to create and recover a spherical precursor, optionally drying this precursor, then adding a Li source such as LiOH, $Li_2CO_3$, or $LiNO_3$, and calcining the resulting mixture at a high temperature, a method for obtaining an active material by dissolving or pulverizing and dispersing a transition metal raw material such as a transition metal nitrate, sulfate, hydroxide, or oxide and optionally a raw material of another element in a solvent such as water, drying and molding the resulting solution or suspension using a spray dryer or the like to obtain a spherical or oval precursor, adding a Li source such as LiOH, $Li_2CO_3$, or $LiNO_3$ to this precursor, and calcining the resulting mixture at a high temperature, and a method for obtaining an active material by dissolving or pulverizing and dispersing a transition metal raw material such as a transition metal nitrate, sulfate, hydroxide, or oxide, a Li source such as LiOH, $Li_2CO_3$, or $LiNO_3$, and optionally a raw material of another element in a solvent such as water, drying and molding the resulting solution or suspension using a spray dryer or the like to obtain a spherical or oval precursor, and calcining this precursor at a high temperature.

In the present disclosure, one positive electrode active material powder may be used alone, or two or more positive electrode active material powders having different formulations or different powder physical characteristics may be used together in any combination and ratio.

The negative electrode active material is not limited as long as it can electrochemically absorb and desorb a lithium ion, and examples thereof include a carbonaceous material, a metal oxide such as tin oxide or silicon oxide, a metal composite oxide, simple lithium and a lithium alloy such as a lithium-aluminum alloy, and a metal that can form an alloy with lithium such as Sn or Si. One of these may be used alone or two or more thereof may be used together in any combination and ratio. Among these, a carbonaceous material or a lithium composite oxide is preferably used from the viewpoint of safety.

The metal composite oxide is not limited as long as it can absorb and desorb lithium, and from the viewpoint of high current density charge/discharge characteristics, it is preferable to contain titanium and/or lithium as a constituent.

From the viewpoint of a good balance between the initial irreversible capacity and the high current density charge/discharge characteristics, the carbonaceous material is preferably selected from:

(1) natural graphite;

(2) an a artificial carbonaceous substance and an artificial graphite substance; and a carbonaceous material obtained by one or more times of heat treatment in the range of 400° C. to 3,200° C. of a carbonaceous substance {for example, natural graphite, coal-based coke, petroleum-based coke, coal-based pitch, petroleum-based pitch, or a material obtained by oxidation treatment of any of these pitches; needle coke, pitch coke, or a carbon material obtained by partial graphitization of any of these cokes; a pyrolysate of an organic substance such as furnace black, acetylene black, or pitch-based carbon fiber; a carbonizable organic substance (for example, coal tar pitches from soft pitch to hard pitch; a coal-based heavy oil such as dry distillation/liquefaction oil; a straight-run heavy oil such as atmospheric residue or vacuum residue; a cracking-derived petroleum heavy oil such as ethylene tar as a byproduct generated in thermal cracking of crude oil, naphtha, or the like; further, an aromatic hydrocarbon such as acenaphthylene, decacyclene, anthracene, or phenanthrene; a N-ring compound such as phenazine or acridine; a S-ring compound such as thiophene or bithiophene; a polyphenylene such as biphenyl or terphenyl; polyvinyl chloride, polyvinyl alcohol, polyvinyl butyral, or a material obtained by insolubilizing any thereof; a nitrogen-containing organic polymer such as polyacrylonitrile or polypyrrole; a sulfur-containing organic polymer such as polythiophene or polystyrene; a natural polymer such as a polysaccharide typified by cellulose, lignin, mannan, polygalacturonic acid, chitosan, or saccharose; a thermoplastic resin such as polyphenylene sulfide or polyphenylene oxide; a thermosetting resin such as a furfuryl alcohol resin, a phenol-formaldehyde resin, or an imide resin) and a carbide of any of these; and a solution obtained by dissolving a carbonizable organic substance in a low-molecular-weight organic solvent such as benzene, toluene, xylene, quinoline, or n-hexane, and a carbide thereof};

(3) a carbonaceous material in which the negative electrode material layer is composed of at least two or more carbonaceous substances having different crystallinities and/or has an interface at which the carbonaceous substances having different crystallinities are in contact with each other; and (4) a carbonaceous material in which the negative electrode material layer is composed of at least two carbonaceous substances having different orientations and/or has an interface at which the carbonaceous substances having different orientations are in contact with each other.

The content of the electrode active material (positive electrode active material or negative electrode active material) is preferably 40% by mass or more in the electrode mixture in order to increase the capacity of the electrode obtained.

The powder electrode material may further include a conductive agent. Examples of the conductive agent include a carbon black such as acetylene black or ketjen black, a carbon material such as graphite, a carbon fiber, a carbon nanotube, and a carbon nanohorn.

The proportion by mass of the powder components (active material and conductive agent) to the above PVdF or binder in the electrode mixture is usually about 80:20 to 99.5:0.5 and is determined in consideration of the holding of the powder components, the adhesiveness to the current collector, and the conductivity of the electrode.

With the blending proportion as described above, the above PVdF or binder cannot completely fill a gap between the powder components in the electrode material layer formed on the current collector, but when a liquid that dissolves or disperses the PVdF or binder well is used as a solvent, the PVdF or binder is uniformly dispersed to form a network structure in the electrode material layer after drying, which holds the powder component well and thus is preferable.

Examples of the liquid include water or a non-aqueous solvent. Examples of the non-aqueous solvent include a nitrogen-containing organic solvent such as N-methyl-2-pyrrolidone, N,N-dimethylacetamide, or dimethylformamide; a ketone-based solvent such as acetone, methylethylketone, cyclohexanone, or methyl isobutyl ketone; an ester-based solvent such as ethyl acetate or butyl acetate; an ether-based solvent such as tetrahydrofuran or dioxane; and also a general-purpose organic solvent having a low boiling point such as a mixed solvent thereof.

Among these, the liquid is preferably at least one selected from the group consisting of N-methyl-2-pyrrolidone and N,N-dimethylacetamide from the viewpoint of excellent stability and coating performance of the electrode mixture.

The amount of the liquid in the electrode mixture is determined in consideration of coating of the current collector, formation of a thin film after drying, and the like. Usually, the proportion by mass of the PVdF or binder to the liquid is preferably 0.5:99.5 to 20:80.

In addition, the above PVdF or binder used desirably has a small particle size that is an average particle size of 1,000 μm or less, particularly 50 to 350 μm, in order to enable rapid dissolution or dispersion in the liquid.

The electrode mixture may further include, for example, an acrylic resin such as polymethacrylate or polymethyl methacrylate, and a polyimide, polyimide, or polyamideimide-based resin, in order to further improve the adhesiveness to the current collector. In addition, a cross-linked structure may be formed by adding a cross-linking agent or applying a radiation such as a γ-ray or an electron beam. The cross-linking treatment method is not limited to application of a radiation, and may be another cross-linking method such as thermal cross-linking by adding an amine group-containing compound, a cyanurate group-containing compound, or the like that is thermally cross-linkable.

In order to improve the dispersion stability of an electrode slurry, a dispersant such as a resin-based or cationic surfactant or a nonionic surfactant having a surfactant action and the like may be added to the electrode mixture.

The content of the PVdF or binder in the electrode mixture is preferably 0.1 to 20% by mass and more preferably 1 to 10% by mass based on the mass of the electrode mixture.

Examples of a method for preparing the electrode mixture include a method involving dispersing and mixing the powder electrode material into a solution or a dispersion obtained by dissolving or dispersing the PVdF or binder in the liquid. Then, the obtained electrode mixture is uniformly applied to a current collector such as a metal foil or a metal net, dried, and optionally pressed to form a thin electrode material layer on the current collector to form a thin-film electrode.

In addition, an electrode mixture may be created by first mixing a powder of the PVdF or binder and a powder of the electrode material and then adding the above liquid. In addition, an electrode sheet can also be created by heating and melting a powder of the PVdF or binder and a powder of the electrode material and extruding the resulting melt using an extruder to create a thin-film electrode mixture, and bonding the thin-film electrode mixture to a current collector to which a conductive adhesive or a general-purpose organic solvent is applied. Further, a solution or a dispersion of the powder of the PVdF or binder and the powder of the electrode material may be applied to an electrode material preformed in advance. As described above, the method of application as a PVdF or a binder is not limited.

The electrode of the present disclosure contains the above PVdF or binder. Because the electrode of the present disclosure contains the above PVdF or binder, even when the powder electrode material is thickly applied, wound, and pressed for high density, the electrode is not cracked and there is no shedding of the powder electrode material or peeling off from the current collector. Further, the electrode of the present disclosure is also excellent in electrolytic solution swelling resistance. In addition, the electrode can be used to create a secondary battery which is unlikely to increase in the resistance value even when stored at a high temperature and in which a sufficient discharge capacity is retained even after repeated charge and discharge.

The above electrode preferably includes a current collector and an electrode material layer containing the above powder electrode material and the above PVdF or binder and formed on the current collector. The above electrode is a positive electrode in some embodiments and is a negative electrode in other embodiments, and is preferably a positive electrode.

Examples of the current collector (positive electrode current collector and negative electrode current collector) include a metal foil and a metal mesh of iron, stainless steel, copper, aluminum, nickel, titanium, or the like. Among these, an aluminum foil or the like is preferable as the positive electrode current collector, and a copper foil or the like is preferable as the negative electrode current collector.

The electrode of the present disclosure can be produced, for example, by the method described above. The above electrode mixture has excellent coating performance, and thus an electrode having a smooth, uniform, and thick electrode material layer can be easily created by creating the electrode of the present disclosure using the above electrode mixture.

The secondary battery of the present disclosure includes the above electrode. In the secondary battery of the present disclosure, at least one of the positive electrode and the negative electrode may be the above electrode, and the positive electrode is preferably the above electrode. The secondary battery is preferably a lithium ion secondary battery. The secondary battery of the present disclosure exhibits a low resistance increase rate and a high capacity retention rate.

The secondary battery of the present disclosure preferably further includes a non-aqueous electrolytic solution. The non-aqueous electrolytic solution is not limited, and may be one or two or more of a known hydrocarbon-based solvent such as propylene carbonate, ethylene carbonate, butylene carbonate, γ-butyl lactone, 1,2-dimethoxyethane, 1,2-diethoxyethane, dimethyl carbonate, diethyl carbonate, or ethylmethyl carbonate; and a fluorinated solvent such as fluoroethylene carbonate, fluoroether, or fluorinated carbonate. Any conventionally known electrolyte can be used, and $LiClO_4$, $LiAsF_6$, $LiPF_6$, $LiBF_4$, LiCl, LiBr, $CH_3SO_3Li$, $CF_3SO_3Li$, cesium carbonate, or the like can be used.

In addition, a separator may be interposed between the positive electrode and the negative electrode. The separator may be a conventionally known separator or a separator using the above PVdF or binder for coating.

It is also preferable to use the above PVdF or binder for at least one of the positive electrode, the negative electrode, and the separator of the secondary battery (preferably lithium ion secondary battery).

A film for a secondary battery made of the above PVdF or binder is also one of the preferable embodiments of the present disclosure.

A laminate for a secondary battery having a substrate and a layer made of the above PVdF or binder formed on the substrate is also one of the preferable embodiments of the present disclosure. Examples of the substrate include those given as examples of the above current collector, and a known substrate (porous film or the like) used for a separator of a secondary battery.

The embodiments have been described above, and it will be understood that various modifications of the embodiments and details are possible without departing from the spirit and scope of the claims.

According to the present disclosure, provided is a polyvinylidene fluoride comprising: vinylidene fluoride unit; and a pentenoic acid unit represented by formula (1): $CH_2{=}CH{-}(CH_2)_2{-}COOY$ wherein Y represents at least one selected from the group consisting of an inorganic cation and an organic cation, a content of vinylidene fluoride unit is 95.0 to 99.99 mol % based on all monomer units of the polyvinylidene fluoride, and a content of the pentenoic acid unit is 0.01 to 5.0 mol % based on all monomer units of the polyvinylidene fluoride.

Y in formula (1) preferably represents at least one selected from the group consisting of H, Li, Na, K, Mg, Ca, Al, and $NH_4$.

The weight average molecular weight is preferably 50,000 to 2,000,000.

In addition, according to the present disclosure, a binder containing the above polyvinylidene fluoride is provided.

In addition, according to the present disclosure, provided is an electrode mixture containing the above polyvinylidene fluoride or the above binder, a powder electrode material, and water or a non-aqueous solvent.

In addition, according to the present disclosure, an electrode containing the above polyvinylidene fluoride or the above binder is provided.

In addition, according to the present disclosure, a secondary battery including the above electrode is provided.

EXAMPLES

Next, the embodiments of the present disclosure will be described with reference to Examples, but the present disclosure is not limited only to the Examples.

The numerical values in the Examples were measured by the following methods.

(Polymer Formulation)

The content of the pentenoic acid unit in a PVdF was measured by converting the carboxyl group of the pentenoic acid unit into an ester group by esterification and then analyzing the esterified PVdF using $^1H$-NMR. Specifically, 400 mg of a PVdF, 10 mg of trimethylsilyldiazomethane, and 3 mg of methanol were reacted at 25° C. for 12 hours, the resulting polymer was cleaned with methanol and vacuum dried at 70° C. for 24 hours, and then the dried polymer was analyzed using $^1H$-NMR to determine the content from a $^1H$-NMR spectrum with 3.7 ppm.

(Solution Viscosity)

An NMP solution (5% by mass) of the PVdF (binder) was prepared. The viscosity of the NMP solution 10 minutes after the start of measurement was measured using a B-type viscometer (manufactured by Toki Sangyo Co., Ltd., TV-10M) under conditions of 25° C., rotor No. M4, and a rotation speed of 6 rpm.

(Weight Average Molecular Weight)

The weight average molecular weight was measured by gel permeation chromatography (GPC). The weight average molecular weight was calculated from data (reference: polystyrene) obtained by measurement using AS-8010, CO-8020, and columns (three GMHHR-H connected in series) manufactured by Tosoh Corporation and RID-10A manufactured by Shimadzu Corporation under a flow of dimethylformamide (DMF) as a solvent at a flow rate of 1.0 ml/min.

(Melting Point)

The temperature corresponding to the maximum value on the heat of fusion curve when the temperature was raised from 30° C. to 220° C. at a rate of 10° C./min, then lowered to 30° C. at 10° C./min, and again raised to 220° C. at a rate of 10° C./min using a differential scanning calorimetry (DSC) apparatus was determined as the melting point.

(Electrolytic Solution Swelling Resistance)

An NMP solution (8% by mass) of the PVdF (binder) was cast on a glass petri dish and vacuum dried at 100° C. for 6 hours to create a film having a thickness of 200 μm. The obtained film was cut off into a size of 10 mmΦ, placed in a sample bottle containing an electrolytic solution (a solution obtained by dissolving $LiPF_6$ in a solvent having a volume ratio of ethylene carbonate to ethylmethyl carbonate of 3/7 at a concentration of 1 M), and allowed to stand at 60° C. for 1 week, and then the electrolytic solution swelling resistance was evaluated by determining the weight increase rate from the following expression.

Weight increase rate (%)=(film weight after immersion in electrolytic solution/film weight before immersion in electrolytic solution)×100

(Viscosity of Positive Electrode Mixture)

The viscosity of the positive electrode mixture was measured immediately after preparing the positive electrode mixture. The viscosity of the positive electrode mixture 10 minutes after the start of measurement was measured using a B-type viscometer (manufactured by Toki Sangyo Co., Ltd., TV-10M) under conditions of 25° C., rotor No. M4, and a rotation speed of 6 rpm.

(Density of Positive Electrode Material Layer)

The density of the positive electrode material layer was calculated from values obtained by measuring the area, the film thickness, and the weight of the positive electrode material layer.

(Peel Strength Between Positive Electrode Material Layer and Positive Electrode Current Collector of Positive Electrode)

The positive electrode was cut off to create a 1.2 cm×7.0 cm test piece. The positive electrode material layer side of the test piece was fixed to a movable jig using a double-sided tape, then a tape was attached to the surface of a positive electrode current collector, and the stress (N/cm) when the tape was pulled at an angle of 90 degrees at a speed of 100 mm/min was measured using an autograph. 1 N was used for the load cell of the autograph.

(Flexibility of Positive Electrode)

A 2 cm×10 cm test piece was created by cutting off the positive electrode and wound around a round bar having a diameter of 3.0 mm, and the positive electrode was visually checked and evaluated according to the following criteria.

Good: No crack or breakage was observed.

Acceptable: A crack was observed in the positive electrode material layer, but no breakage of the positive electrode material layer or the current collector was observed.

Poor: The positive electrode material layer and the current collector were broken.

(Cycle Capacity Retention Rate)

The cycle capacity retention rate was measured using an aluminum laminate cell (secondary battery) created in an Experimental Example. The secondary battery was charged to 4.2 V at a constant current corresponding to 0.5 C at 25° C., then charged at a constant voltage of 4.2 V until the current value was 0.1 C, and discharged to 3.0 V at a constant current of 0.5 C. 3 cycles of this operation were carried out to stabilize the battery. After that, the secondary battery was charged to 4.2 V at a constant current of 0.5 C, then charged at a constant voltage of 4.2 V until the current value was 0.1 C, and discharged to 3.0 V at a constant current of 0.5 C to determine the initial discharge capacity. Charge and discharge were carried out in the same manner, and the discharge capacity after 300 cycles was measured. The proportion of the discharge capacity after 300 cycles to the initial discharge capacity was determined based on the following expression, and this was taken as the cycle capacity retention rate (%). Results are shown in Table 2.

(Discharge capacity after 300 cycles)/(initial discharge capacity)×100=cycle capacity retention rate (%)

Example 1

668 g of VdF was placed together with 1,546 g of pure water, 1.5 g of methyl cellulose, 1 ml of 4-pentenoic acid, 2 ml of methanol, and 1 g of di-normal propyl peroxydicarbonate in an autoclave having an internal volume of 2.5 liters, and the temperature was raised to 31° C. over 1.5 hours and then retained at 31° C. for 9 hours. The maximum ultimate pressure during this period was 7 MPaG.

Polymerization was completed 9 hours after the temperature was raised to 31° C. After completion of the polymerization, the resulting polymer slurry was recovered, dehydrated, and washed with water, and further dried at 118° C. for 12 hours to obtain a PVdF powder.

Example 2

520 g of VdF was placed together with 1,700 g of pure water, 1.7 g of methyl cellulose, 2 ml of 4-pentenoic acid, 2 ml of methanol, and 1 g of di-normal propyl peroxydicarbonate in an autoclave having an internal volume of 2.5 liters, and the temperature was raised to 36° C. over 1.5 hours and retained at 36° C. for 30 hours. The maximum ultimate pressure during this period was 7 MPaG.

Polymerization was completed 30 hours after the temperature was raised to 36° C. After completion of the polymerization, the resulting polymer slurry was recovered, dehydrated, and washed with water, and further dried at 118° C. for 12 hours to obtain a PVdF powder.

Example 3

520 g of VdF was placed together with 1,700 g of pure water, 1.7 g of methyl cellulose, 2 ml of 4-pentenoic acid, 2 ml of methanol, and 1 g of di-normal propyl peroxydicarbonate in an autoclave having an internal volume of 2.5 liters, and the temperature was raised to 36° C. over 1.5 hours and retained at 36° C. for 37 hours. The maximum ultimate pressure during this period was 7 MPaG.

Polymerization was completed 37 hours after the temperature was raised to 36° C. After completion of the polymerization, the resulting polymer slurry was recovered, dehydrated, and washed with water, and further dried at 118° C. for 12 hours to obtain a PVdF powder.

Example 4

520 g of VdF was placed together with 1,700 g of pure water, 1.7 g of methyl cellulose, 2 ml of 4-pentenoic acid, 2 ml of methanol, and 1 g of di-normal propyl peroxydicarbonate in an autoclave having an internal volume of 2.5 liters, and the temperature was raised to 36° C. over 1.5 hours and retained at 36° C. for 39 hours. The maximum ultimate pressure during this period was 7 MPaG.

Polymerization was completed 39 hours after the temperature was raised to 36° C. After completion of the polymerization, the resulting polymer slurry was recovered, dehydrated, and washed with water, and further dried at 118° C. for 12 hours to obtain a PVdF powder.

Example 5

357 g of VdF was placed together with 700 g of pure water, 0.35 g of methyl cellulose, 0.8 ml of 4-pentenoic acid, 1.0 ml of methanol, and 2.0 g of t-butyl peroxy-2-ethylhexanoate in an autoclave having an internal volume of 2 liters, and the temperature was raised to 72° C. over 1.5 hours and retained at 72° C. for 18 hours. The maximum ultimate pressure during this period was 7.9 MPaG.

Polymerization was completed 18 hours after the temperature was raised to 72° C. After completion of the polymerization, the resulting polymer slurry was recovered, dehydrated, and washed with water, and further dried at 118° C. for 12 hours to obtain a PVdF powder.

Comparative Example 1

1,173 g of VdF was placed together with 839 g of pure water, 0.84 g of methyl cellulose, 2 ml of methanol, and 1 g of di-normal propyl peroxydicarbonate in an autoclave having an internal volume of 2.5 liters, and the temperature was raised to 31° C. over 1.5 hours and retained at 31° C. for 3 hours. The maximum ultimate pressure during this period was 7 MPaG.

Polymerization was completed 3 hours after the temperature was raised to 31° C. After completion of the polymerization, the resulting polymer slurry was recovered, dehydrated, and washed with water, and further dried at 118° C. for 12 hours to obtain a PVdF powder.

Experimental Example (Preparation of Positive Electrode Mixture)

An NMP solution was prepared by dissolving the PVdF (binder) obtained in each of the Examples and the Comparative Example in N-methyl-2-pyrrolidone (NMP) such that the concentration of the PVdF (binder) in the NMP solution was 8% by mass. A positive electrode active material (NMC (811) ($LiNi_{0.8}Mn_{0.1}Co_{0.1}O_2$)) and a conductive agent (acetylene black (AB)) were added to the resulting NMP solution, and the resulting mixture was sufficiently mixed using a stirrer to prepare a positive electrode mixture. The mass ratio of the positive electrode active material, the conductive agent, and the PVdF (binder) in the positive electrode mixture was 96/2/2. In addition, the solid concentration of the positive electrode mixture was as shown in Table 1.

(Creation of Positive Electrodes)

The obtained positive electrode mixture was uniformly applied to one side of a positive electrode current collector (aluminum foil having a thickness of 20 μm) such that the coating mass was 22.5 mg/cm$^2$, and NMP was completely volatilized, then the positive electrode current collector was pressed using a roll press by applying a pressure of 10 tons to create a positive electrode including a positive electrode material layer and the positive electrode current collector. The density of the positive electrode material layer was 2.75 g/cc.

(Preparation of Electrolytic Solution)

Ethylene carbonate, which is a high dielectric constant solvent, and ethylmethyl carbonate, which is a low viscosity solvent, were mixed such that the volume ratio therebetween was 30:70, $LiPF_6$ was added to the resulting mixture in such a way as to have a concentration of 1.0 mol/liter, and 2% by mass of vinylene carbonate was added to this mixture to obtain a non-aqueous electrolytic solution.

(Creation of Lithium Ion Secondary Battery)

The positive electrode obtained above was cut out into a shape having a coated portion (positive electrode material layer) having a width of 50 mm and a length of 30 mm and an uncoated portion having a width of 5 mm and a length of 9 mm.

1 Part by mass of an aqueous dispersion of carboxymethyl cellulose sodium (concentration of carboxymethyl cellulose sodium of 1% by mass) and 1 part by mass of an aqueous dispersion of styrene butadiene elastomer (concentration of styrene butadiene elastomer of 50% by mass) as a thickener and a binder were added to 98 parts by mass of artificial graphite and mixed using a disperser to foam a slurry. The obtained slurry was applied to a copper foil having a thickness of 20 μm, dried, and rolled using a press, the rolled foil was cut out into a shape having a coated portion (negative electrode material layer) having a width of 52 mm and a length of 32 mm and an uncoated portion having a width of 5 mm and a length of 9 mm, and the cut foil was used as the negative electrode.

The positive electrode and the negative electrode were opposed to each other via a microporous polyethylene film (separator) having a thickness of 20 μm, the non-aqueous electrolytic solution obtained above was injected, the non-aqueous electrolytic solution was caused to sufficiently permeate into the separator and the like, and then the resultant was sealed, precharged, and aged to create an aluminum laminate cell (lithium ion secondary battery).

Evaluation results are shown in Table 1.

TABLE 1

| | PVdF | | | | | Positive electrode mixture | | Positive electrode | | Secondary battery |
|---|---|---|---|---|---|---|---|---|---|---|
| | Content of pentenoic acid unit (mol %) | Solution viscosity (mPa · s) | Weight average molecular weight weight (x10$^4$) | Melting point (° C.) | Electrolytic solution swelling resistance (%) | Solid concentration (% by mass) | Viscosity (mPa · s) | Peel strength (N/cm) | Flexibility φ3.0 mm | 300 Cycle capacity retention rate (%) |
| Example 1 | 0.09 | 712 | 116 | 173 | 122 | 71.5 | 20500 | 0.62 | Good | 70 |
| Example 2 | 0.17 | 1335 | 132 | 165 | 123 | 69.0 | 21600 | 0.59 | Good | 68 |
| Example 3 | 0.40 | 600 | 100 | 168 | 124 | 71.0 | 18000 | 0.57 | Good | 63 |

TABLE 1-continued

| | PVdF | | | | | Positive electrode mixture | | Positive electrode | | Secondary battery 300 Cycle capacity retention rate (%) |
|---|---|---|---|---|---|---|---|---|---|---|
| | Content of pentenoic acid unit (mol %) | Solution viscosity (mPa · s) | Weight average molecular weight (×$10^4$) | Melting point (° C.) | Electrolytic solution swelling resistance (%) | Solid concentration (% by mass) | Viscosity (mPa · s) | Peel strength (N/cm) | Flexibility ϕ3.0 mm | |
| Example 4 | 0.79 | 69 | 46 | 170 | 127 | 74.0 | 23200 | 0.30 | Good | 61 |
| Example 5 | 0.21 | 321 | 70 | 161 | 126 | 72.5 | 20825 | 0.51 | Good | 66 |
| Comparative Example 1 | 0 | 2400 | 168 | 168 | 128 | 65.0 | 19800 | 0.19 | Poor | 70 |

The invention claimed is:

1. A polyvinylidene fluoride comprising:

vinylidene fluoride unit; and a pentenoic acid unit represented by formula (1):

$CH_2{=}CH{-}(CH_2)_2{-}COOY$ wherein Y represents at least one selected from the group consisting of an inorganic cation and an organic cation, a content of vinylidene fluoride unit is 97.0 to 99.99 mol % based on all monomer units of the polyvinylidene fluoride, and a content of the pentenoic acid unit is 0.01 to 3.0 mol % based on all monomer units of the polyvinylidene fluoride.

2. The polyvinylidene fluoride according to claim 1, wherein Y represents at least one selected from the group consisting of H, Li, Na, K, Mg, Ca, Al, and NH4.

3. The polyvinylidene fluoride according to claim 1, wherein a weight average molecular weight is 50,000 to 2,000,000.

4. An electrode mixture comprising the polyvinylidene fluoride according to claim 1, a powder electrode material, and water or a non-aqueous solvent.

5. An electrode comprising the polyvinylidene fluoride according to claim 1.

6. A secondary battery comprising the electrode according to claim 5.

* * * * *